United States Patent [19]

Randmae

[11] Patent Number: 5,032,919
[45] Date of Patent: Jul. 16, 1991

[54] VIDEO CAMERA FOCUSING SYSTEM

[75] Inventor: Rein S. Randmae, Fort Salonga, N.Y.

[73] Assignee: Vicon Industries, Inc., Melville, N.Y.

[21] Appl. No.: 396,479

[22] Filed: Aug. 21, 1989

[51] Int. Cl.⁵ .......................................... H04N 5/232
[52] U.S. Cl. .................................. 358/227; 358/225; 358/229
[58] Field of Search ............... 358/225, 229, 199, 227, 358/224, 226; 354/195.1

[56] References Cited

U.S. PATENT DOCUMENTS

| | | | |
|---|---|---|---|
| 2,380,829 | 7/1945 | Eddy | 358/225 |
| 4,369,470 | 1/1983 | Contant | 358/229 |
| 4,413,278 | 11/1983 | Feinbloom | 358/225 |
| 4,600,938 | 7/1986 | Sluyter et al. | 358/229 |
| 4,600,939 | 7/1986 | Sluyter et al. | 358/229 |
| 4,764,783 | 8/1988 | Tanaka | 354/195.1 |

Primary Examiner—John K. Peng
Assistant Examiner—Sherrie Hsia
Attorney, Agent, or Firm—Darby & Darby

[57] ABSTRACT

To focus the video camera, the CCD image pickup device moves relative to the lens mount which is maintained fixed in relation to the camera body. The lens mount includes a cylindrical bearing surface on which symmetrically spaced carrier bearings slide when a focusing ring is turned. Cam followers connected to the carrier ride on ramps incorporated in the focusing ring. When the focusing ring rotates, the cam followers slide along the moving ramp surfaces and cause corresponding motion of the CCD pickup device.

10 Claims, 3 Drawing Sheets

VIDEO CAMERA FOCUSING SYSTEM

FIELD OF THE INVENTION

This invention relates generally to video cameras and more particularly to the lens focusing system of video cameras.

BACKGROUND OF THE INVENTION

Closed circuit TV, for example, a video surveillance, system has become increasingly popular in such applications as banks, department stores, outdoor parking lots, apartment buildings, and in industrial surveillance. The cost of the video camera is a major factor in selecting such security systems and advancements in solid state technology and development of CCD (charge coupled device) cameras have reduced the costs and greatly enhanced the market for such systems. Interchangeable lenses allow use of closed circuit video in many situations for both close and also distant surveillance. However, picture resolution, that is, the number of lines per frame, which is achieved with the small CCD pickup elements used in surveillance video cameras, is substantially below the quality of conventional broadcast television reception. Quality is far below the resolution which is anticipated from forthcoming high definition television systems. If the maximum inherent capability of a CCD video camera is to be realized in actual usage, it is essential that the optical system bring the observed image into the sharpest possible focus on the imaging pick-up element, that is, the CCD screen. Failure to maintain the planar receiving surface of the CCD image pickup element truly parallel to the lens throughout a given range of focusing adjustment, is a deficiency in many prior art CCD video cameras. Commercial CCD video cameras are known having a somewhat unstable mechanism for adjusting the focus of the camera using a pair of opposed bearings.

OBJECTS OF THE INVENTION

Accordingly, it is an object of this invention to provide an improved video camera focusing system which maintains a proper relationship between the CCD pickup device and the lens over the entire range of focusing.

Another object of this invention is to provide an improved video camera focusing system which is simple to assemble and disassemble, permitting efficient field servicing of the pickup device in the field.

Yet another object of this invention is to provide an improved video camera focusing system which requires few parts and is economical to produce.

SUMMARY OF THE INVENTION

In accordance with the invention, a focusing system is provided which is especially suitable for CCD video cameras in surveillance applications. Focusing adjustment is accomplished by moving the CCD image pickup device relative to the lens. The lens is maintained fixed in relation to the camera body. When a focusing ring, which surrounds the camera lens mount, is rotated, the carrier for the charge coupled image pickup element moves parallel to the optical axis of the lens. The carrier for the image pickup device has three bearing surfaces spaced 120° apart extending therefrom and the lens mount includes a cylindrical bearing surface. These carrier bearing surfaces ride on the lens mount bearing surface, and include cam followers which ride on ramps incorporated in the focusing ring. A spring urges the cam followers against the focusing ramps. Thus, when the focusing ring is rotated, the cam followers slide along the moving ramp surfaces and cause corresponding motion of the CCD pickup device. The lens mount is fixedly connected to the camera body and the lens does not move during focusing operations. Use of three symmetrically positioned bearings to guide the image pickup element eliminates rocking and assures accurate alignment of the CCD device with the optical axis of the lens throughout the entire range of motion of the image pickup element during focusing.

Further objects and advantages of the invention will be apparent from the specification and drawings. The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
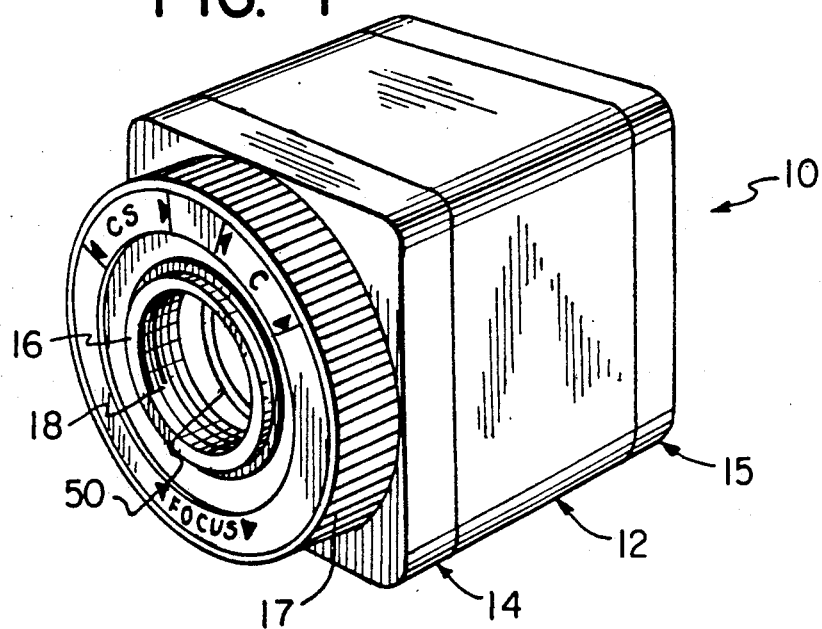
FIG. 1 is a top perspective view of a video camera including the focusing system in accordance with the invention.
Figure 2:
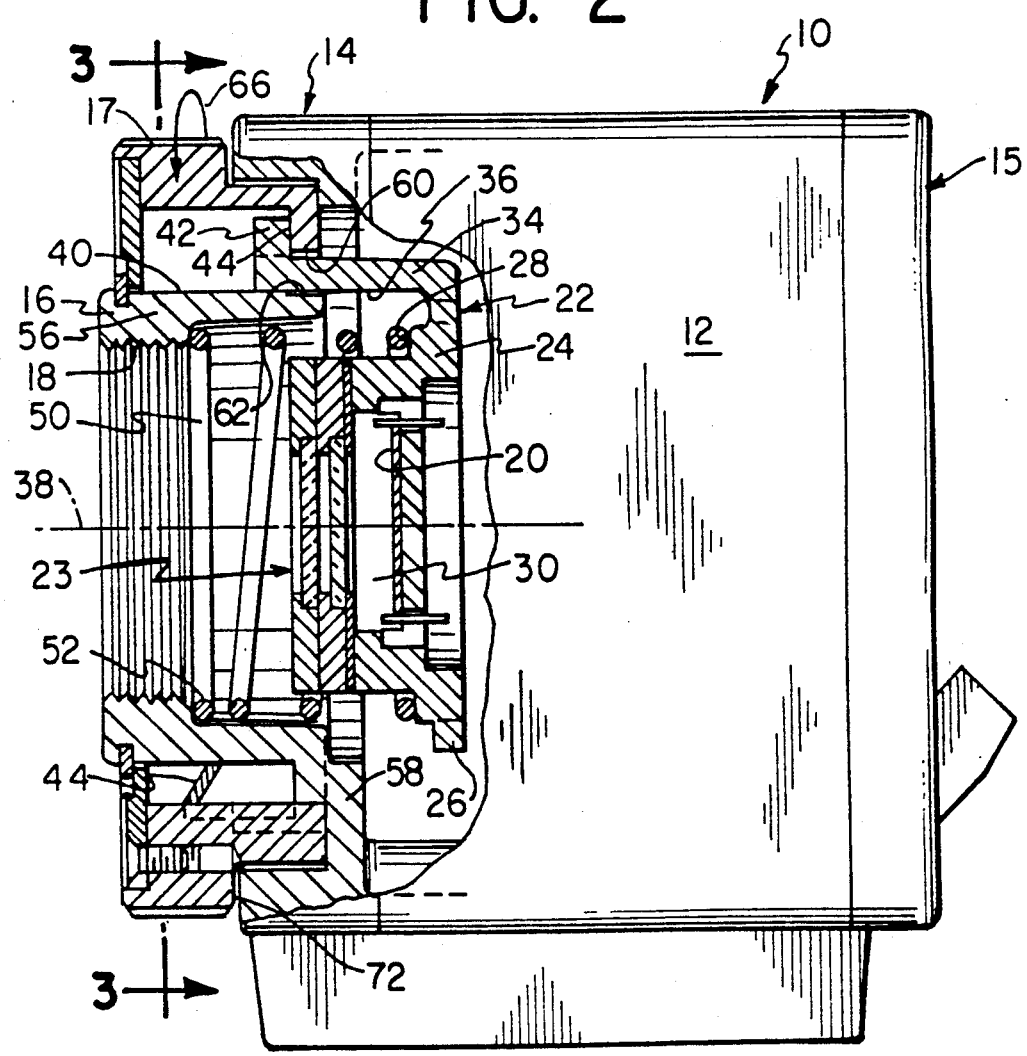
FIG. 2 is a side elevational view, partially in section and to an enlarged scale, of the video camera of FIG. 1.
Figure 3:
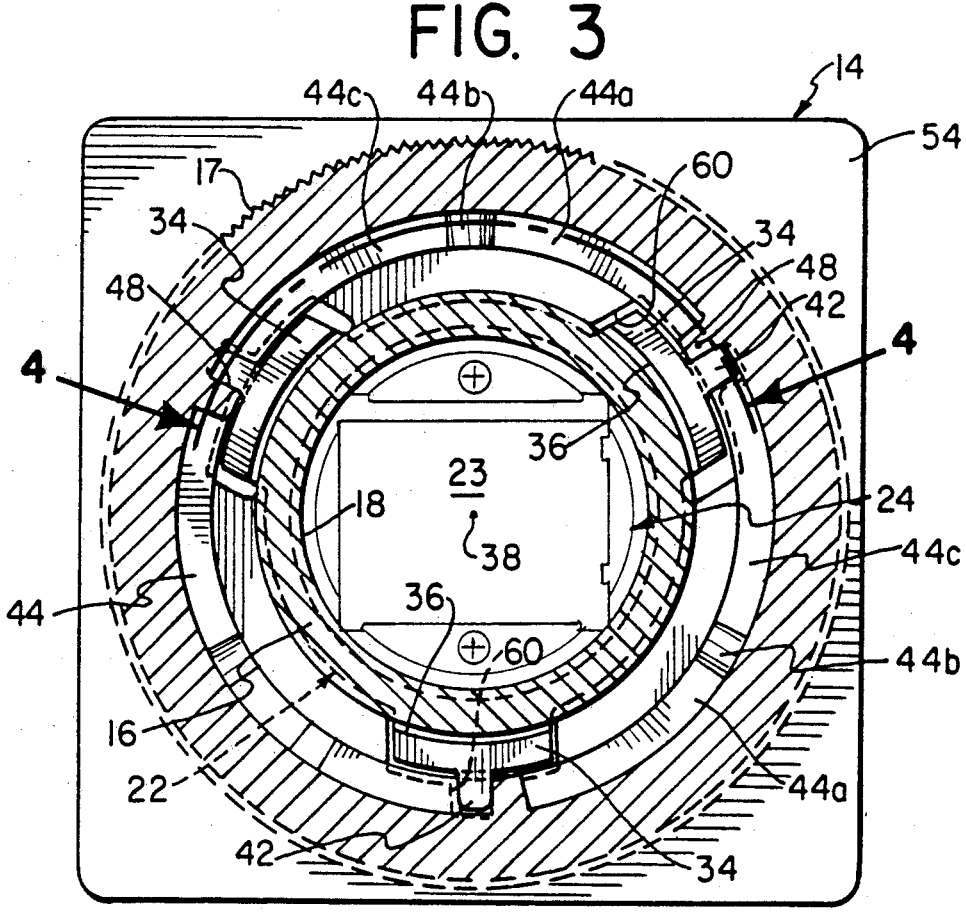
FIG. 3 is a sectional view in elevation taken along the line 3—3 of FIG. 2.
Figure 4:
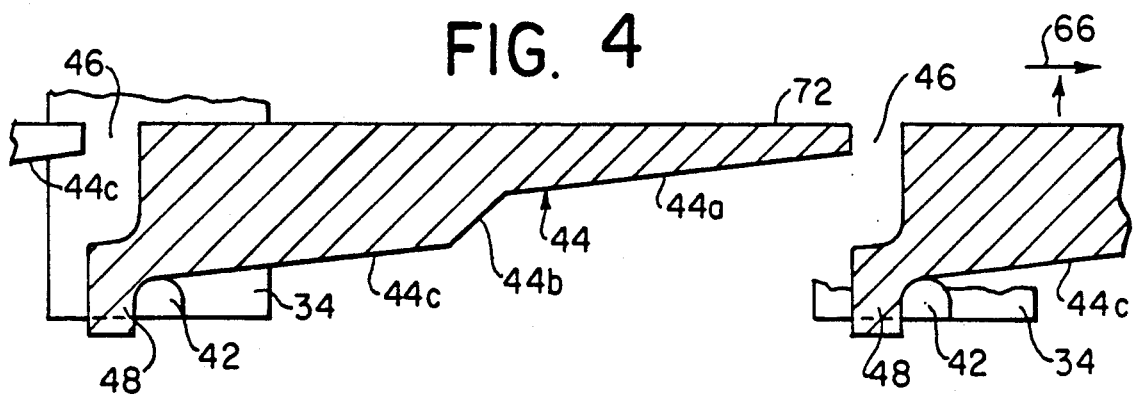
FIG. 4 is a circumferential sectional view to an enlarged scale taken along the arc 4—4 of FIG. 3.
Figure 5:
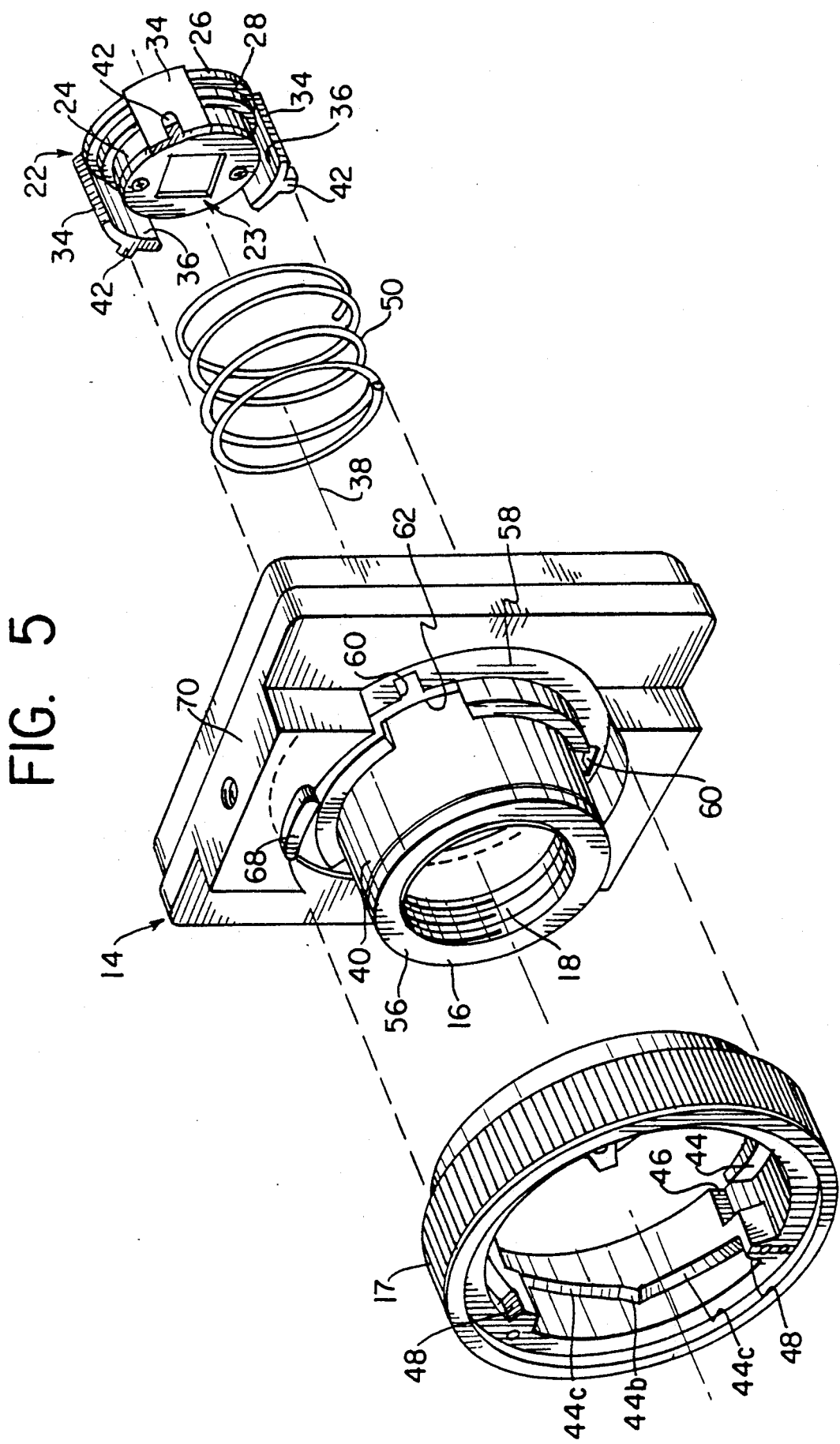
FIG. 5 is an exploded perspective view of the video camera focusing system in accordance with the invention.

With reference to the figures, a video camera 10 includes a main housing 12, a front panel 14 and a rear panel 15, which, when joined together as shown in FIG. 1, form an enclosure for internal circuit boards and elements, both mechanical and electrical, which constitute a video camera. The front panel 14 includes an integral lens mount 16 having internal threads 18 to which a lens in a holder is threadably engaged in a conventional manner when using the camera. For the sake of clarity in illustration, the lens and its holder are omitted from the figures. A focusing ring 17 surrounds the lens mount 16.

An image pickup element 20, which in the embodiment illustrated herein is a charge coupled device or screen, is mounted within a carrier 22 and covered by a filter assembly 23. The carrier 22 includes a circular pedestal 24 which is stepped to produce a flange 26 and a shoulder 28. A cavity 30 has the image pickup element 20 mounted within it by any suitable means.

Three guide bearings 34 are positioned radially outward from the flange 26 and have bearing surfaces 36 which are concave segments of a cylindrical surface. The bearing surfaces 36 are concentric with the optical axis 38 of the lens mount 16 and a lens which, in use, would be held by the lens mount. A convex cylindrical bearing surface 40, also concentric with the optical axis 38, is formed on the outside of the lens mount 16. The bearing surfaces 36, 40 are dimensioned for a telescopic fit with close tolerance. A cam follower 42 extends radially outward from each guide bearing 34.

In an assembled device, the cam followers 42 ride on internal cams or ramps 44, respectively, fixed in the focusing ring 17. The ramp surfaces 44 are in three segments, namely segments 44a and 44c, having approximately the same slope, separated by segment 44(b) having a greater slope. The ramp surface 44 terminates at one end in an entrance slot 46 and at the other end with a stop 48. The cam followers 42 of the carrier 22 ride on the cam surfaces 44 as explained more fully hereinafter. A compression spring 50 rests at one end against the shoulder 28 on the carrier 22 and against a shoulder 52 within the lens mount 16 at the other end, and urges the carrier 22 away from the lens mount 16.

The front panel 14 includes a basically rectangular portion 54 which serves as the closing or front panel for the enclosure of the camera assembly 10, and a generally cylindrical portion 56 which includes the lens mount 16. The cylindrical portion 56 has internal threads 18, as stated above, to hold a lens assembly (not shown). The spring 50 rides at one end on the shoulder 52 adjacent the threads 18. The rear wall 58 of the front panel 14, where the cylindrical portion 56 joins the rectangular portion 54, has three somewhat T-shaped openings 60 therethrough and uniformly spaced around the cylindrical portion 56. The arcuate edge 62 of each opening 60 is substantially of the same radius as the bearing surface 40 on the outside of the cylindrical portion 56. The leg 64, which extends radially outward in each T-shaped opening 60, is dimensioned to allow passage therethrough of the cam follower 42 on the carrier 22. The cross-bar portion of each T-shaped opening 60 is curved and allows a guide bearing 34 to pass through. The front panel 14 is assembled to the main housing 12 in any conventional manner. Accordingly the fastening means for the panel 14 are not described or illustrated herein.

To assemble the carrier 22 with the imaging or pickup element 20 attached thereto into a focusing system, the spring 50 is cradled in the carrier 22, resting upon the shoulder 28. The bearings 34 and cam followers 42 are then simultaneously pushed through the T-shaped openings 60 in the front panel 14 whereby the spring 50 is compressed between the shoulder 28 on the carrier 22 and the shoulder 52 on the lens mount 16. The guide bearing surfaces 36 on the carrier 22 ride on the outer bearing surface 40 of the lens mount 16. Then, the focusing ring 17 is slipped over the lens mount 16 with the cam followers 42 simultaneously entering the slots 46. When the focusing ring 17 is turned in the direction of the arrow 66, the cam followers 42 ride up the ramp surfaces 44 from segment 44a toward segment 44c. In the extreme rotated position of the ring 17, the cam followers 42 rest laterally against the stops 48 on the focusing ring 17. As the focusing ring 17 and ramps 44 move in the direction of the arrow 66, the spring 50 is further compressed and the image pickup element 20 moves closer to the lens mount 16. The three sliding bearings prevent rocking of the pick-up element 20 from its orientation at a right angle to the axis 38.

A tab 68 extends from a forward surface 70 on the front panel 14 and engages a groove (not shown) formed into a rear surface 72 of the focusing ring 17. The compression force of the spring 50 constantly urges the carrier 22 away from the focusing ring 17. In this way, a pressurized contact between the cam followers 42 and the ramp surfaces 44 is maintained. As the focusing ring is turned in one direction and the other, the carrier 22 moves forward and backward along the optical axis 38. The broad guide bearing surfaces 36, symmetrically located in three positions on the bearing surface 40, assure parallelism between the lens and the imaging element 20 during focusing motions as well as in a stationary position, and when the camera is subjected to shocks.

The slot (not shown) in which the tab 68 rides is of limited arc such that in normal focusing manipulations, the cam followers 42 cannot move to the position of the slots 46, where unintended separation of the focusing ring 17 and the carrier 22 could occur. During a disassembly procedure when the surface 72 is separated from the face 70 of the rectilinear portion 54, the tab 68 leaves the slot in the focusing ring 17. Then, the ring 17 is turnable to the position where the cam followers 42 can pass through the slots 46. The focusing ring 17 separates from the carrier 22 and front panel 14. Inadvertent separation is not possible.

In an alternative embodiment in accordance with the invention, the number of bearings 34 may be greater than three and the number of openings 60 is correspondingly increased.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense. It is also to be understood that the following claims are intended to cover all of the generic and specific features of the invention herein described and all statements of the scope of the invention which might be said to fall therebetween.

What is claimed is:

1. A focusing system for a video camera, comprising:
    a carrier for mounting an imaging element thereon:
    a lens mount for holding a lens thereon, said carrier and said lens mount being aligned to a common axis and positioned relative to each other whereby, in use, said imaging element and said lens are spaced apart;
    at least three guide bearings having bearing surfaces spaced around said axis, said guide bearings being fixedly connected to one of said carrier and said lens mount, each said guide bearing surface riding on an opposing bearing surface, said opposing bearing surface being connected to the other one of said carrier and said lens mount; and
    means for telescopically and adjustably moving and setting said carrier and said lens mount relative to each other, whereby, in use, the distance along said axis between said lens and said imaging element is adjustable.

2. A focusing system for a video camera as claimed in claim 1, wherein said means for adjustably moving and setting includes cam means for connecting said carrier to said lens mount, said cam means having a ramp and cam follower, the position of said cam follower on said ramp determining said distance, in use, between said lens and imaging element.

3. A focusing system for a video camera as claimed in claim 2, wherein said means for adjustably moving and setting further includes a spring positioned between said carrier and said lens mount for continuously urging said carrier and said lens mount apart, said spring urging said cam follower against said ramp.

4. A focusing system for a video camera as claimed in claim 1, wherein said guide bearings are connected to said carrier, said guide bearing surfaces being cylindrically concave, said opposing bearing surface being connected to said lens mount and being cylindrically convex.

5. A focusing system for a video camera as claimed in claim 4, wherein said guide bearing surfaces and said opposing surface are in sliding contact.

6. A focusing system for a video camera as claimed in claim 4, and further comprising a focus ring rotatably attached to said lens mount, and wherein said means for moving and setting include a ramp fixed to said focus ring for rotation therewith about said common axis, said carrier means including a cam follower for sliding engagement with said ramp when said focusing ring rotates, rotation of said focusing ring causing said lens mount and carrier to move relative to each other.

7. A focusing system for a video camera as claimed in claim 6, wherein said means for adjustably moving and setting further includes a spring positioned between said carrier and said lens mount for continuously urging said carrier and said lens mount apart, said spring urging said cam follower against said ramp.

8. A focusing system for a video camera as claimed in claim 7, wherein said guide bearings are connected to said carrier, said guide bearing surfaces being cylindrically concave, said opposing bearing surface being connected to said lens mount and being cylindrically convex.

9. A focusing system for a video camera as claimed in claim 8, wherein said guide bearing surfaces and said opposing surface are in sliding contact.

10. A focusing system for a video camera as claimed in claim 1, wherein said guide bearing surfaces are symmetrically spaced around said axis.

* * * * *